(12) United States Patent
Novak et al.

(10) Patent No.: US 11,103,934 B2
(45) Date of Patent: Aug. 31, 2021

(54) HOLE CUTTER WITH MULTIPLE FULCRUMS

(71) Applicant: BLACK & DECKER INC., New Britain, CT (US)

(72) Inventors: Joseph Thomas Novak, East Longmeadow, MA (US); Matthew Christopher Green, Amherst, MA (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 16/713,221

(22) Filed: Dec. 13, 2019

(65) Prior Publication Data

US 2020/0114435 A1    Apr. 16, 2020

Related U.S. Application Data

(60) Continuation of application No. 16/294,155, filed on Mar. 6, 2018, now Pat. No. 10,549,356, which is a continuation of application No. 15/989,287, filed on May 25, 2018, now Pat. No. 10,500,652, which is a continuation of application No. 15/585,982, filed on May 3, 2017, now Pat. No. 10,500,651, which is a continuation of application No. 14/708,596, filed on
(Continued)

(51) Int. Cl.
    *B23B 51/04* (2006.01)
(52) U.S. Cl.
    CPC ...... *B23B 51/0453* (2013.01); *B23B 51/0406* (2013.01); *B23B 2251/428* (2013.01); *B23B 2260/082* (2013.01); *Y10T 408/895* (2015.01)
(58) Field of Classification Search
    CPC ............. B23B 51/0406; B23B 51/0453; Y10T 408/895

USPC ................. 408/204, 205, 206, 703
See application file for complete search history.

(56) References Cited

U.S. PATENT DOCUMENTS

D44,561 S     8/1913 Gotjck
1,150,279 A   8/1915 Little
(Continued)

FOREIGN PATENT DOCUMENTS

AU    2009225643 B2    9/2009
DE       20101718 U1    5/2001
(Continued)

OTHER PUBLICATIONS

Coja, Michael—Extended European Search Report re corresponding application No. EP19201282.1-1019—dated Dec. 19, 2019—5 pages—European Patent Office Munich Germany.
(Continued)

*Primary Examiner* — Eric A. Gates
(74) *Attorney, Agent, or Firm* — Scott B. Markow (57) ABSTRACT

A hole cutter has a cylindrical blade body including a cutting edge and one or more axially-elongated apertures formed within a side wall of the blade body. The axially-elongated aperture is configured to receive a lever, such as a screwdriver, therethrough. Each axially-elongated aperture includes a first fulcrum axially spaced adjacent to the cutting edge, a second fulcrum axially spaced further away from the cutting edge than the first fulcrum, and optionally a third fulcrum axially spaced between the first and second fulcrums. A lever, such as a screwdriver, can be inserted into the aperture and placed against each of the fulcrums to lever slugs out of the interior of the blade body.

10 Claims, 4 Drawing Sheets

Related U.S. Application Data

May 11, 2015, now Pat. No. 9,724,766, which is a continuation of application No. 29/496,442, filed on Jul. 14, 2014, now Pat. No. Des. 789,428, which is a division of application No. 29/465,441, filed on Aug. 28, 2013, now Pat. No. Des. 711,441, which is a division of application No. 29/417,810, filed on Apr. 9, 2012, now Pat. No. Des. 692,470, which is a continuation of application No. 29/353,762, filed on Jan. 13, 2010, now Pat. No. Des. 690,334, and a continuation of application No. 29/353,759, filed on Jan. 13, 2010, now Pat. No. Des. 659,176, and a continuation of application No. 13/006,117, filed on Jan. 13, 2011, now Pat. No. 9,782,839, which is a continuation-in-part of application No. 12/687,078, filed on Jan. 13, 2010, now Pat. No. 9,808,869, and a continuation-in-part of application No. 13/006,080, filed on Jan. 13, 2011, now Pat. No. 8,579,555, which is a continuation-in-part of application No. 12/687,065, filed on Jan. 13, 2010, now Pat. No. 8,579,554.

(56) References Cited

U.S. PATENT DOCUMENTS

| | | |
|---|---|---|
| 1,194,503 A | 8/1916 | Jawoisch |
| 1,234,468 A | 7/1917 | Hamilton |
| 1,494,897 A | 5/1924 | Herman |
| 1,713,972 A | 5/1929 | Lufkin |
| 2,179,029 A | 11/1939 | Ernest |
| 2,313,176 A | 2/1943 | Kotowski |
| 2,319,528 A | 5/1943 | Barbour et al. |
| D139,299 S | 10/1944 | Walters |
| 2,427,085 A | 9/1947 | Allison |
| 2,473,077 A | 6/1949 | Starbuck, Jr. |
| 2,482,439 A | 9/1949 | Smith |
| D160,574 S | 10/1950 | Carlson |
| 2,633,040 A | 3/1953 | Schlage |
| 2,779,361 A | 1/1957 | McKiff |
| 2,794,469 A | 6/1957 | Shortell |
| 2,817,899 A | 12/1957 | Wheeler |
| 2,852,967 A | 9/1958 | Mueller et al. |
| 2,947,206 A | 8/1960 | Flanagan |
| 3,162,067 A | 12/1964 | Koons et al. |
| 3,220,449 A | 11/1965 | Franklin |
| 3,221,709 A | 12/1965 | Racaj |
| D204,877 S | 5/1966 | West |
| 3,387,637 A | 6/1968 | Richard et al. |
| 3,390,596 A | 7/1968 | Trevathan |
| 3,495,359 A | 2/1970 | Smith et al. |
| 3,593,419 A | 7/1971 | Hula |
| 3,610,768 A | 10/1971 | Cochran |
| 3,804,238 A | 4/1974 | Howard |
| 3,810,514 A | 5/1974 | Viscovich |
| 3,880,546 A | 4/1975 | Segal |
| 3,929,050 A | 12/1975 | Salzwedel |
| 3,973,862 A | 8/1976 | Segal |
| 4,077,737 A | 3/1978 | Morse |
| 4,089,112 A | 5/1978 | Richards |
| 4,180,909 A | 1/1980 | Lind |
| D264,800 S | 6/1982 | Osada |
| D266,735 S | 11/1982 | Hahn |
| 4,408,935 A | 10/1983 | Miyanaga |
| 4,541,758 A | 9/1985 | Frank et al. |
| D281,979 S | 12/1985 | Meier |
| D282,369 S | 1/1986 | Villiers |
| 4,595,321 A | 6/1986 | Dalen |
| 4,631,829 A | 12/1986 | Schmidt et al. |
| 4,651,425 A | 3/1987 | Livian |
| 4,652,185 A | 3/1987 | Malrick |
| 4,660,284 A | 4/1987 | DeCarolis |
| 4,755,087 A | 7/1988 | Parent |
| 4,757,612 A | 7/1988 | Peyrot |
| 4,760,643 A | 8/1988 | Juma |
| D300,897 S | 5/1989 | Hagberg et al. |
| D303,118 S | 8/1989 | Cox |
| 4,891,884 A | 1/1990 | Torbet |
| 5,007,777 A | 4/1991 | Itokazu |
| D317,455 S | 6/1991 | Martin |
| 5,044,393 A | 9/1991 | Jiles |
| 5,049,010 A | 9/1991 | Oakes |
| 5,058,620 A | 10/1991 | Jiles |
| 5,061,126 A | 10/1991 | Cain et al. |
| 5,082,403 A | 1/1992 | Sutton et al. |
| D324,326 S | 3/1992 | Lu |
| 5,171,111 A | 12/1992 | Kishimoto |
| 5,205,675 A | 4/1993 | Hamel |
| 5,205,685 A | 4/1993 | Herbert |
| D342,270 S | 12/1993 | Kwang |
| 5,351,595 A | 10/1994 | Johnston |
| 5,360,300 A | 11/1994 | Sullivan |
| D359,967 S | 7/1995 | Eichenberg et al. |
| 5,451,128 A | 9/1995 | Hattersley |
| 1,564,105 A | 12/1995 | Ouellet |
| D368,633 S | 4/1996 | Nakayama |
| 5,597,274 A | 1/1997 | Behner |
| 5,651,646 A | 7/1997 | Banke et al. |
| D382,885 S | 8/1997 | Deiner et al. |
| 5,676,501 A | 10/1997 | Peetz et al. |
| D388,318 S | 12/1997 | Achterberg et al. |
| D391,974 S | 3/1998 | Brutscher |
| D392,297 S | 3/1998 | Brutscher |
| 5,791,837 A | 8/1998 | Johnson |
| 5,803,677 A | 9/1998 | Brutscher |
| 5,803,678 A | 9/1998 | Korb et al. |
| 5,806,189 A | 9/1998 | Bailey |
| 5,820,315 A | 10/1998 | Collard |
| D401,822 S | 12/1998 | Pearlman |
| D406,220 S | 3/1999 | Schmidt |
| D408,831 S | 4/1999 | McGregor |
| 5,904,454 A | 5/1999 | Washer |
| 5,906,050 A | 5/1999 | Gilbert |
| 5,909,930 A | 6/1999 | Ragland, III et al. |
| D412,654 S | 8/1999 | Gilbert et al. |
| D412,655 S | 8/1999 | Gilbert et al. |
| D412,822 S | 8/1999 | Gilbert et al. |
| D422,185 S | 4/2000 | Gold |
| D423,038 S | 4/2000 | Shimoyama |
| 6,120,220 A | 9/2000 | Speare |
| 6,152,661 A | 11/2000 | Thrasher |
| D438,219 S | 2/2001 | Brutscher |
| D443,495 S | 6/2001 | Wang |
| D450,552 S | 11/2001 | Mason |
| 6,341,925 B1 | 1/2002 | Despres |
| 6,357,973 B2 | 3/2002 | Chao |
| D455,057 S | 4/2002 | Medhurst |
| 6,363,614 B1 | 4/2002 | Umstead et al. |
| D457,269 S | 5/2002 | Arey |
| D459,172 S | 6/2002 | Bissell |
| 6,409,436 B1 | 6/2002 | Despres |
| 6,438,849 B1 | 8/2002 | Wonderley |
| D462,241 S | 9/2002 | Lothe |
| 6,564,887 B2 | 5/2003 | Hong et al. |
| 6,578,268 B2 | 6/2003 | Hawketts |
| 6,588,992 B2 | 7/2003 | Rudolph |
| 6,599,063 B1 | 7/2003 | Capstran |
| D478,105 S | 8/2003 | Morton et al. |
| D478,106 S | 8/2003 | Morton et al. |
| D478,339 S | 8/2003 | Morton et al. |
| D478,919 S | 8/2003 | Morton et al. |
| 6,623,220 B2 | 9/2003 | Nuss et al. |
| 6,641,338 B2 | 11/2003 | Despres |
| 6,676,343 B2 | 1/2004 | Burke |
| 6,708,410 B2 | 3/2004 | Okada |
| 6,718,640 B1 | 4/2004 | John |
| 6,746,187 B2 | 6/2004 | Alm |
| 6,786,684 B1 | 9/2004 | Ecker |
| 6,820,519 B2 | 11/2004 | Lefebvre |
| 6,857,831 B2 | 2/2005 | Davis |
| 6,883,968 B2 | 4/2005 | Fugel et al. |
| 6,893,194 B2 | 5/2005 | Jones et al. |
| D508,389 S | 8/2005 | Polk |
| 6,948,574 B2 | 9/2005 | Cramer et al. |

(56) References Cited

U.S. PATENT DOCUMENTS

| | | |
|---|---|---|
| 7,003,833 B2 | 2/2006 | Feliciano |
| D516,594 S | 3/2006 | Morton |
| D517,894 S | 3/2006 | Kondo et al. |
| 7,097,397 B2 | 8/2006 | Keightley |
| 7,101,124 B2 | 9/2006 | Keightley |
| 7,127,979 B2 | 10/2006 | Kocher et al. |
| 7,160,064 B2 | 1/2007 | Jasso |
| 7,163,363 B2 | 1/2007 | Keightley |
| 7,189,036 B1 | 3/2007 | Watson |
| D539,616 S | 4/2007 | Taylor et al. |
| 7,237,291 B2 | 7/2007 | Redford |
| 7,258,513 B2 | 8/2007 | Gertner |
| D551,269 S | 9/2007 | Burke, III |
| D559,044 S | 1/2008 | Ono |
| D562,651 S | 2/2008 | Harkey |
| 7,340,836 B2 | 3/2008 | Whitemiller et al. |
| D565,382 S | 4/2008 | Watanabe |
| D588,175 S | 3/2009 | Morton |
| 7,553,114 B2 | 6/2009 | Oknestam et al. |
| 7,556,459 B2 | 7/2009 | Rompel |
| 7,611,312 B2 | 11/2009 | Miyanaga |
| 7,621,703 B2 | 11/2009 | Keightley |
| 7,637,703 B2 | 12/2009 | Khangar et al. |
| 7,658,136 B2 | 2/2010 | Rompel et al. |
| 7,658,576 B1 | 2/2010 | Buzdum et al. |
| 7,661,913 B2 | 2/2010 | Nordlin |
| 7,674,078 B1 | 3/2010 | Buzdum et al. |
| D620,035 S | 7/2010 | Eades |
| 7,785,047 B2 | 8/2010 | Jauch |
| D624,808 S | 10/2010 | Krawczak et al. |
| 7,818,867 B1 | 10/2010 | Capstran et al. |
| 7,824,137 B2 | 11/2010 | Vasudeva et al. |
| 7,850,405 B2 | 12/2010 | Keightley |
| D631,732 S | 2/2011 | Krawczak et al. |
| 7,886,445 B2 | 2/2011 | Constantine et al. |
| 7,921,568 B2 | 4/2011 | Green |
| 7,934,893 B2 | 5/2011 | Gillissen |
| 7,959,371 B2 | 6/2011 | Keightley |
| 7,967,535 B2 | 6/2011 | Eiserer et al. |
| D644,327 S | 8/2011 | Singh |
| 8,052,356 B2 | 11/2011 | Singh |
| 8,079,787 B2 | 12/2011 | Chao |
| 8,113,748 B2 | 2/2012 | Werner |
| 8,123,443 B2 | 2/2012 | Khangar et al. |
| D659,176 S | 5/2012 | Novak et al. |
| D664,574 S | 7/2012 | Burke, III |
| 8,221,037 B2 | 7/2012 | Neitzell |
| D687,472 S | 8/2013 | Novak et al. |
| D690,334 S | 9/2013 | Zielonka |
| D692,470 S | 10/2013 | Novak et al. |
| 8,573,907 B2 | 11/2013 | Kalomeris et al. |
| 8,579,554 B2 | 11/2013 | Novak et al. |
| 8,579,555 B2 | 11/2013 | Novak et al. |
| 8,646,601 B2 | 2/2014 | Green et al. |
| D701,544 S | 3/2014 | Novak et al. |
| 8,684,641 B2 | 4/2014 | Moffatt |
| 8,696,268 B2 | 4/2014 | Bell et al. |
| D706,845 S | 6/2014 | Richter |
| 8,739,414 B2 | 6/2014 | Tyers |
| D708,650 S | 7/2014 | Richter |
| D711,441 S | 8/2014 | Novak et al. |
| 9,022,703 B2 | 5/2015 | Keightley |
| 9,120,162 B2 | 9/2015 | Keightley |
| 9,233,424 B2 | 1/2016 | Grolimund et al. |
| 9,248,513 B2 | 2/2016 | Lai |
| 2002/0037201 A1 | 3/2002 | Despres |
| 2002/0121023 A1 | 9/2002 | Kocher et al. |
| 2002/0122703 A1 | 9/2002 | Czyzewski |
| 2003/0084575 A1 | 5/2003 | Chen |
| 2003/0088985 A1 | 5/2003 | Huang |
| 2003/0094078 A1 | 5/2003 | Clanton |
| 2003/0200661 A1 | 10/2003 | Okada |
| 2004/0042861 A1 | 3/2004 | Capstran |
| 2005/0022390 A1 | 2/2005 | Whitemiller et al. |
| 2005/0050734 A1 | 3/2005 | Kesinger |
| 2005/0172416 A1 | 8/2005 | Feliciano |
| 2005/0193566 A1 | 9/2005 | Brown et al. |
| 2005/0214086 A1 | 9/2005 | Nicholas |
| 2005/0244238 A1 | 11/2005 | Burk |
| 2005/0262702 A1 | 12/2005 | Hawthorn |
| 2006/0016315 A1 | 1/2006 | Zorich et al. |
| 2006/0130629 A1 | 6/2006 | Rompel et al. |
| 2006/0285934 A1 | 12/2006 | Keightley |
| 2007/0003386 A1 | 1/2007 | Keightley |
| 2007/0036620 A1 | 2/2007 | Keightley |
| 2007/0110527 A1 | 5/2007 | Jasso |
| 2007/0166116 A1 | 7/2007 | Olson et al. |
| 2007/0212179 A1 | 9/2007 | Khangar et al. |
| 2007/0227012 A1 | 10/2007 | Constantine et al. |
| 2007/0245574 A1 | 10/2007 | Green |
| 2007/0269280 A1 | 11/2007 | Vasudeva et al. |
| 2008/0019785 A1 | 1/2008 | Keightley |
| 2008/0050189 A1 | 2/2008 | Keightley |
| 2008/0131223 A1 | 6/2008 | Jauch |
| 2008/0181738 A1 | 7/2008 | Capriotti et al. |
| 2008/0187405 A1 | 8/2008 | Nordlin |
| 2008/0260480 A1 | 10/2008 | Keightley |
| 2009/0035082 A1 | 2/2009 | Singh |
| 2009/0044674 A1 | 2/2009 | Neitzell |
| 2009/0106909 A1 | 4/2009 | Tyers |
| 2009/0169317 A1 | 7/2009 | Rae |
| 2009/0252567 A1 | 10/2009 | Gillissen |
| 2009/0304468 A1 | 12/2009 | Duggan |
| 2009/0326539 A1 | 12/2009 | Neumeyer et al. |
| 2010/0034608 A1 | 2/2010 | Nordlin et al. |
| 2010/0047030 A1 | 2/2010 | Eiserer et al. |
| 2010/0067995 A1 | 3/2010 | Keightley |
| 2010/0080665 A1 | 4/2010 | Keightley |
| 2010/0086372 A1 | 4/2010 | Werner |
| 2010/0247258 A1 | 9/2010 | Keightley |
| 2010/0310332 A1 | 12/2010 | Serba |
| 2011/0027030 A1 | 2/2011 | Capstran et al. |
| 2011/0052340 A1 | 3/2011 | Kozak |
| 2011/0170965 A1 | 7/2011 | Novak et al. |
| 2011/0170966 A1 | 7/2011 | Novak et al. |
| 2011/0170967 A1 | 7/2011 | Novak et al. |
| 2011/0170969 A1 | 7/2011 | Novak et al. |
| 2011/0170970 A1 | 7/2011 | Novak et al. |
| 2011/0170971 A1 | 7/2011 | Novak et al. |
| 2011/0170972 A1 | 7/2011 | Novak et al. |
| 2011/0217133 A1 | 9/2011 | Ibarra et al. |
| 2011/0243675 A1 | 10/2011 | Fach |
| 2012/0009032 A1 | 1/2012 | Grussenmeyer |
| 2012/0183366 A1 | 7/2012 | Stenman |
| 2014/0023446 A1 | 1/2014 | Piller et al. |

FOREIGN PATENT DOCUMENTS

| | | |
|---|---|---|
| EP | 0295309 A1 | 12/1988 |
| EP | 0295309 B1 | 5/1993 |
| EP | 1080859 A1 | 3/2001 |
| EP | 1080859 A1 | 3/2001 |
| JP | H07-124809 A2 | 5/1995 |
| JP | 2006-321024 A | 11/2006 |
| WO | WO-1997/031742 A1 | 9/1997 |
| WO | WO-2009/015488 A1 | 2/2009 |

OTHER PUBLICATIONS

International Search Report and Written Opinion of the International Searching Authority for International Application No. PCT/US2011/021217, dated Mar. 9, 2011.

Final Written Decision issued in Inter Partes Review No. IPR2015-01461 on Sep. 29, 2016.

Final Written Decision issued in Inter Partes Review No. IPR2015-01462 on Sep. 29, 2016.

Petitioner's Reply filed in Inter Partes Review No. IPR2015-01461 on Jun. 15, 2016.

Petitioner's Exhibit List filed in Inter Partes Review No. IPR2015-01461 on Jun. 15, 2016.

Exhibit 1008 (Deposition Transcript of Glenn Vallee) filed in Inter Partes Review No. IPR2015-01461 on Jun. 15, 2016.

(56) References Cited

OTHER PUBLICATIONS

Exhibit 1009 (Deposition Transcript of Joseph T. Novak) filed in Inter Partes Review No. IPR2015-01461 on Jun. 15, 2016.
Exhibit 1010 (Declaration of Andrew Dufresne) filed in Inter Partes Review No. IPR2015-01461 on Jun. 15, 2016.
Exhibit 1011 (Printed lenoxtools.com webpage describing LENOX Diamond™ Hole Saws) filed in Inter Partes Review No. IPR2015-01461 on Jun. 15, 2016.
Exhibit 1012 (Printed lenoxtools.com webpage describing LENOX Carbide Tipped Hole Saws) filed in Inter Partes Review No. IPR2015-01461 on Jun. 15, 2016.
Exhibit 1013 (Printed lenoxtools.com webpage describing LENOX Carbide Grit Hole Saws) filed in Inter Partes Review No. IPR2015-01461 on Jun. 15, 2016.
Exhibit 1014 (Printed lenoxtools.com webpage describing LENOX One Tooth® Rough Wood Hole Cutter filed in Inter Partes Review No. IPR2015-01461 on Jun. 15, 2016.
Exhibit 1015 (Printed lenoxtools.com webpage describing LENOX Carbide Grit Recessed Lighting Hole Saws) filed in Inter Partes Review No. IPR2015-01461 on Jun. 15, 2016.
Patent owner's Motion to Exclude Evidence Under 37 C.F.R. 42.64 filed in Inter Partes Review No. IPR2015-01461 on Jul. 22, 2016.
Exhibit 1016 (Declaration of Andrew Dufresne) filed in Inter Partes Review No. IPR2015-01461 on Aug. 5, 2016.
Exhibit 1017 (Printed e-mail from Counsel for Petitioners to Counsel for Patent Owner) filed in Inter Partes Review No. IPR2015-01461 on Aug. 5, 2016.
Petitioner's Opposition to Patent Owner's Motion to Exclude Evidence filed in Inter Partes Review No. IPR2015-01461 on Aug. 5, 2016.
Petitioner's Exhibit List in filed in Inter Partes Review No. IPR2015-01461 on Aug. 5, 2016.
Patent Owner's Reply to Petitioner's Opposition to Patent Owner's Motion to Exclude Evidence filed in Inter Partes Review No. IPR2015-01461 on Aug. 12, 2016.
Patent Owner's Exhibit List filed in Inter Partes Review No. IPR2015-01461 on Aug. 24, 2016.
Exhibit 2012 (Patent Owner's Demonstratives for Oral Hearing) filed in Inter Partes Review No. IPR2015-01461 on Aug. 24, 2016.
Exhibit 1018 (Petitioners' Demonstrative Exhibit for Oral Hearing) filed in Inter Partes Review No. IPR2015-01461 on Aug. 24, 2016.
Patent Owner's Notice of Withdrawal of Portions of its Motion to Exclude Evidence Under 37 C.F.R. 42.64 filed in Inter Partes Review No. IPR2015-01461 on Aug. 29, 2016.
Petitioner's Reply filed in Inter Partes Review No. IPR2015-01462 on Jun. 15, 2016.
Petitioner's Exhibit List filed in Inter Partes Review No. IPR2015-01462 on Jun. 15, 2016.
Exhibit 1008 (Deposition Transcript of Glenn Vallee) filed in Inter Partes Review No. IPR2015-01462 on Jun. 15, 2016.
Exhibit 1009 (Deposition Transcript of Joseph T. Novak) filed in Inter Partes Review No. IPR2015-01462 on Jun. 15, 2016.
Exhibit 1010 (Declaration of Andrew Dufresne) filed in Inter Partes Review No. IPR2015-01462 on Jun. 15, 2016.
Exhibit 1011 (Printed lenoxtools.com webpage describing LENOX DiamondTM Hole Saws) filed in Inter Partes Review No. IPR2015-01462 on Jun. 15, 2016.
Exhibit 1012 (Printed lenoxtools.com webpage describing LENOX Carbide Tipped Hole Saws) filed in Inter Partes Review No. IPR2015-01462 on Jun. 15, 2016.
Exhibit 1013 (Printed lenoxtools.com webpage describing LENOX Carbide Grit Hole Saws) filed in Inter Partes Review No. IPR2015-01462 on Jun. 15, 2016.
Exhibit 1014 (Printed lenoxtools.com webpage describing LENOX One Tooth® Rough Wood Hole Cutter filed in Inter Partes Review No. IPR2015-01462 on Jun. 15, 2016.
Exhibit 1015 (Printed lenoxtools.com webpage describing LENOX Carbide Grit Recessed Lighting Hole Saws) filed in Inter Partes Review No. IPR2015-01462 on Jun. 15, 2016.
Patent owner's Motion to Exclude Evidence Under 37 C.F.R. 42.64 filed in Inter Partes Review No. IPR2015-01462 on Jul. 22, 2016.
Exhibit 1016 (Declaration of Andrew Dufresne) filed in Inter Partes Review No. IPR2015-01462 on Aug. 5, 2016.
Exhibit 1017 (Printed e-mail from Counsel for Petitioners to Counsel for Patent Owner) filed in Inter Partes Review No. IPR2015-01462 on Aug. 5, 2016.
Petitioners Opposition to Patent Owner's Motion to Exclude Evidence filed in Inter Partes Review No. IPR2015-01462 on Aug. 5, 2016.
Petitioner's Exhibit List in filed in Inter Partes Review No. IPR2015-01462 on Aug. 5, 2016.
Patent Owner's Reply to Petitioner's Opposition to Patent Owner's Motion to Exclude Evidence filed in Inter Partes Review No. IPR2015-01462 on Aug. 12, 2016.
Patent Owner's Exhibit List filed in Inter Partes Review No. IPR2015-01462 on Aug. 24, 2016.
Exhibit 2012 (Patent Owner's Demonstratives for Oral Hearing) filed in Inter Partes Review No. IPR2015-01462 on Aug. 24, 2016.
Exhibit 1018 (Petitioner's Demonstrative Exhibit for Oral Hearing) filed in Inter Partes Review No. IPR2015-01462 on Aug. 24, 2016.
Patent Owner's Notice of Withdrawal of Portions of Its Motion to Exclude Evidence Under 37 C.F.R. 42.64 Inter Partes Review No. IPR2015-01462 on Aug. 29, 2016.
Petition for Inter Partes Review of U.S. Pat. No. 8,579,554 Under U.S.C. 311-319 filed in Inter Partes Review No. IPR2015-01461 on Jun. 22, 2015.
Exhibit 1002 (Declaration of James Pangerc) filed in Inter Partes Review No. IPR2015-01461 on Jun. 22, 2015.
Exhibit 1006 (Webster's Dictionary Page) filed in Inter Partes Review No. IPR2015-01461 on Jun. 22, 2015.
Exhibit 1007 (Office Action issued in U.S. Appl. No. 12/687,065 dated Mar. 5, 2013) filed in Inter Partes Review No. IPR2015-01461 on Jun. 22, 2015.
Decision—Institution of Inter Partes Review issued in Partes Review No. IPR2015-01461 on Nov. 30, 2015.
Patent Owner's Objections to Evidence Submitted with Petition filed in Inter Partes Review No. IPR2015-01461 on Dec. 14, 2015.
Patent Owner's Supplemental Objections to Evidence Submitted with Petition filed in Inter Partes Review No. IPR2015-01461 on Feb. 26, 2016.
Patent Owner's Response filed in Inter Partes Review No. IPR2015-01461 on Mar. 15, 2016.
Patent Owner's Exhibit List filed in Inter Partes Review No. IPR2015-01461 on Mar. 15, 2016.
Exhibit 2002 (Response to Non-Final Office Action filed in U.S. Appl. No. 12/687,065 dated Jul. 5, 2013) filed in Inter Partes Review No. IPR2015-01461 on Mar. 15, 2016.
Exhibit 2003 (Deposition Transcript from Cross-Examination of James Pangerc taken on Feb. 19, 2016) filed in Inter Partes Review No. IPR2015-01461 on Mar. 15, 2016.
Exhibit 2004 (Declaration of Glenn E. Vallee dated Mar. 15, 2016) filed in Inter Partes Review No. IPR2015-01461 on Mar. 15, 2016.
Exhibit 2005 (Curriculum Vitae [CV] of Glenn E. Vallee) filed in Inter Partes Review No. IPR2015-01461 on Mar. 15, 2016.
Exhibit 2006 (Declaration of Joseph Thomas Novak dated Mar. 15, 2016) filed in Inter Partes Review No. IPR2015-01461 on Mar. 15, 2016.
Exhibit 2007 (Curriculam Vitae [CV] of Joseph Thomas Novak) filed in Inter Partes Review No. IPR2015-01461 on Mar. 15, 2016.
Exhibit 2008 (Declaration of Matthew K. Lacroix dated Mar. 15, 2016) filed in Inter Partes Review No. IPR2015-01461 on Mar. 15, 2016.
Exhibit 2009 (Attachment to Declaration of Matthew K. Lacroix) filed in Inter Partes Review No. IPR2015-01461 on Mar. 15, 2016.
Exhibit 2010 (Attorney annotated comparison of Figure 4 of the '554 patent and Figure 2 from Redford) filed in Inter Partes Review No. IPR2015-01461 on Mar. 15, 2016.
Exhibit 2011 (White Paper entitled "LENOX Bi-Metal Speed-Slot™ Hole Saw Up to 2X Life in Metal" dated 2011) filed in Inter Partes Review No. IPR2015-01461 on Mar. 15, 2016.

(56) References Cited

OTHER PUBLICATIONS

Petition for Inter Partes Review of U.S. Pat. No. 8,579,555 under U.S.C. 311-319 filed in Inter Partes Review No. IPR2015-01462 on Mar. 15, 2016.
Exhibit 1002 (Declaration of James Pangerc) filed in Inter Partes Review No. IPR2015-01462 on Jun. 22, 2015.
Exhibit 1006 (Webster's Dictionary Page) filed in Inter Partes Review No. IPR2015-01462 on Jun. 22, 2015.
Exhibit 1007 (Office Action issued in U.S. Appl. No. 13/006,080 dated Mar. 5, 2013) filed in Inter Partes Review No. IPR2015-01462 on Jun. 22, 2015.
Decision—Institution of Inter Partes Review issued in Inter Partes Review No. IPR2015-01462 on Nov. 30, 2015.
Petitioner's Request for Rehearing under 37 C.F.R. 42.71(d) filed in Inter Partes Review No. IPR2015-01462 on Dec. 9, 2015.
Patent Owner's Objections to Evidence Submitted with Petition filed in filed in Inter Partes Review No. IPR2015-01462 on Dec. 14, 2015.
Decision—Request for Rehearing issued in filed in Inter Partes Review No. IPR2015-01462 on Jan. 15, 2016.
Patent Owner's Supplemental Objections to Evidence Submitted with Petition filed in Inter Partes Review No. IPR2015-01462 on Feb. 26, 2016.
Patent Owner's Exhibit List filed in Inter Partes Review No. IPR2015-01462 on Mar. 15, 2016.
Exhibit 2002 (Response to Non-Final Office Action filed in U.S. Appl. No. 13/006,680 dated Jul. 5, 2013) filed in Inter Partes Review No. IPR2015-01462 on Mar. 15, 2016.
Exhibit 2003 (Deposition Transcript from Cross-Examination of James Pangerc taken on Feb. 19, 2016) filed in Inter Partes Review No. IPR2015-01462 on Mar. 15, 2016.
Exhibit 2004 (Declaration of Glenn E. Vallee dated Mar. 15, 2016) filed in Inter Partes Review No. IPR2015-01462 on Mar. 15, 2016.
Exhibit 2005 (Curriculum Vitae [CV] of Glenn E. Vallee) filed in Inter Partes Review No. IPR2015-01462 on Mar. 15, 2016.
Exhibit 2006 (Declaration of Joseph Thomas Novak dated Mar. 15, 2016) filed in Inter Partes Review No. IPR2015-01462 on Mar. 15, 2016.
Exhibit 2007 (Curriculum Vitae [CV] of Joseph Thomas Novak) filed in Inter Partes Review No. IPR2015-01462 on Mar. 15, 2016.
Exhibit 2008 (Declaration of Matthew K. Lacroix dated Mar. 15, 2016) filed in Inter Partes Review No. IPR2015-01462 on Mar. 15, 2016.
Exhibit 2009 (Attachment to Declaration of Matthew K. Lacroix) filed in Inter Partes Review No. IPR2015-01462 on Mar. 15, 2016.
Exhibit 2010 (Attorney annotated comparison of Figure 4 of the '554 patent and Figure 2 from Redford) filed in Inter Partes Review No. IPR2015-01462 on Mar. 15, 2016.
Exhibit 2011 (White Paper entitled "LENOX Bi-Metal Speed-Slot™ Hole Saw Up to 2X Life in Metal" dated 2011) filed in Inter Partes Review No. IPR2015-01462 on Mar. 15, 2016.
William Henry B04 Pikatti Knife available at http://www.onlyfineknives.com/knife.php?k=224451 accessed Nov. 6, 2008.
Flexible Bi-Metal Hacksaw Blade H888 2008 available at http://www.alibaba.com-productsgs/210815366/Flexible_bi_metal_hacksaw_blade_H888.html accessed on Nov. 6, 2008.
Bi-Metal Hole Saw 825-2Package Greenlee Textron Inc. Rockford, Illinois, 2003.
Office Action issued in U.S. Appl. No. 12/687,078 dated Apr. 11, 2016.
International Search Report and Written Opinion for International Application No. PCT/US2011/021219 dated Apr. 26, 2011.
Office Action issued in U.S. Appl. No. 12/678,065 dated Mar. 5, 2013.
Extended European Search Report issued in application No. 11733410.2 dated Mar. 19, 2014—6 pages.
Communication issued in European application No. 11733410.2, dated Nov. 23, 2016—5 pages.

HOLE CUTTER WITH MULTIPLE FULCRUMS

CROSS REFERENCE TO RELATED APPLICATIONS

This application claims priority to and is a continuation of co-pending U.S. patent application Ser. No. 16/294,155, filed Mar. 6, 2019, titled "Hole Cutter with Multiple Fulcrums," which is a continuation of U.S. patent application Ser. No. 15/989,287, filed on May 25, 2018, titled "Hole Cutter with Multiple Fulcrums," which is a continuation of U.S. patent application Ser. No. 15/585,982, filed on May 3, 2017, titled "Hole Cutter with Multiple Fulcrums," which is a continuation of U.S. patent application Ser. No. 14/708,596, filed on May 11, 2015, now U.S. Pat. No. 9,724,766, issued Aug. 8, 2017, titled "Hole Cutter with Multiple Fulcrums", which is a continuation of U.S. patent application Ser. No. 29/496,442, filed Jul. 14, 2014, titled "Hole Saw", which is a divisional of U.S. patent application Ser. No. 29/465,441, filed Aug. 28, 2013, now U.S. Pat. No. D711,441, issued Aug. 19, 2014, titled "Hole Saw," which is a divisional of U.S. patent application Ser. No. 29/417,810, filed Apr. 9, 2012, now U.S. Pat. No. D692,470, issued Oct. 29, 2013, titled "Hole Saw", which is a continuation of the following applications: U.S. patent application Ser. No. 29/353,762, filed Jan. 13, 2010, now U.S. Pat. No. D690,334, issued Sep. 24, 2013, titled "Hole Saw"; U.S. patent application Ser. No. 29/353,759, filed Jan. 13, 2010, now U.S. Pat. No. D659,176, issued May 8, 2012, titled "Hole Saw"; U.S. patent application Ser. No. 13/006,117, filed Jan. 13, 2011, titled "Hole Cutter with Chip Egress Aperture," which is a continuation-in-part of U.S. patent application Ser. No. 12/687,078, filed Jan. 13, 2010, titled "Hole Cutter with Chip Egress Aperture"; and U.S. patent application Ser. No. 13/006,080, filed Jan. 13, 2011, now U.S. Pat. No. 8,579,555, issued Nov. 12, 2013, titled "Hole Cutter with Axially-Elongated Aperture Defining Multiple Fulcrums", which is a continuation-in-part of U.S. patent application Ser. No. 12/687,065 filed Jan. 13, 2010, now U.S. Pat. No. 8,579,554, issued Nov. 12, 2013, titled "Hole Cutter with Axially-Elongated Aperture Defining Multiple Fulcrums." The entire contents of each of the foregoing applications are hereby expressly incorporated herein by reference as part of this application for all purposes.

FIELD OF THE INVENTION

The present invention relates to hole cutters, and more particularly, to hole cutters with apertures in their side walls that define fulcrums for inserting and levering a tool, such as a screwdriver, to remove work piece slugs from the interiors of the hole cutters.

BACKGROUND

A hole cutter, or hole saw, is a type of cutter used in drilling circular holes in various materials, such as wood, metal, drywall, etc. A hole cutter typically has a substantially cylindrical body that defines a side wall, a circular cutting edge with teeth located at one end of the body and designed to cut a work piece during rotation of the cutter, and a cap located at the end of the body opposite the cutting edge. The cap typically includes threads, holes or other structure adapted to allow the hole cutter to be drivingly connected to a drill, such as through an arbor. In use, the circular cutting edge creates a circular hole in a work piece and, in turn, removes a circular work piece slug therefrom. Typically, after the hole is cut in the work piece, the work piece slug is retained within the hollow interior of the hole cutter and must be removed therefrom prior to cutting another hole.

Prior art hole cutters include apertures or slots formed in the side walls of the hole cutters that allow users to insert a lever, such as a screwdriver, through the side wall and into the interior of the hole cutter to, in turn, lever or otherwise urge the slug out of the hole cutter. This manual slug removal task can be time-consuming and take substantial effort on the part of the user. A slug may be difficult to extract from within the body of a cutter, even with a hole cutter that includes slug removal apertures or slots, because the slug can become tightly wedged in the cutter or because the slug removal apertures or slots are not aligned with the slug. For example, a slug may become warped or cracked and thus firmly lodged within the hole cutter. As another example, some work pieces, such as woods, contain sticky or glue-like residue that inhibits slug removal. As yet another example, thicker and thinner work pieces will create slugs of differing thicknesses and slugs positioned at different locations within the hole cutter. A thick work piece can create a thick slug that is pushed deep into the body of the hole cutter, whereas a thin work piece can create a thin slug located near the cutting edge. Accordingly, slugs often do not simply "pop" out of the cutter when worked by a tool. Slugs often slide short distances, twist, tilt or otherwise gradually or incrementally move along the inside of the cutter. The apertures in the side walls of prior art hole cutters can be relatively short, and therefore may be used only to remove either relatively thin or relatively thick work piece slugs, but not both types of slugs, and possibly not slugs of medium thicknesses. Other prior art hole cutters have plural apertures that are axially and angularly spaced relative to each other, wherein each aperture is relatively short in length. These types of apertures may require moving the screwdriver or other lever from one aperture to another in order to lever a slug out of the hole cutter. Further, no one aperture may be properly positioned for a particular slug thickness, or a particular slug positioning within the interior of the hole cutter, further contributing to the difficult and time consuming nature of the slug removal process.

Accordingly, it is an object of the present invention to overcome one or more of the above-described drawbacks and/or disadvantages of the prior art.

SUMMARY

In accordance with a first aspect, the present invention is directed to a hole cutter comprising a substantially cylindrical blade body defining a cutting edge and at least one axially-elongated aperture formed through the blade body. The axially-elongated aperture is configured to receive therethrough a lever, such as a screwdriver, for removing a work piece slug from the interior of the blade body. The blade body defines within the axially-elongated aperture a plurality of fulcrums for engaging the lever and levering slugs out of the interior of the blade body. The fulcrums include a first fulcrum axially spaced adjacent to the cutting edge and a second fulcrum axially spaced further away from the cutting edge than the first fulcrum. Some embodiments of the present invention further include a third fulcrum axially spaced between the first and second fulcrums.

In some embodiments of the present invention, such as for relatively large diameter hole cutters, the hole cutter comprises a plurality of the axially-elongated apertures angularly spaced relative to each other. In other embodiments of the present invention, such as for relatively small diameter hole cutters, the hole cutter comprises only one axially-elongated aperture. In some such embodiments, the relatively small diameter hole cutters have diameters of about 1 7/16 inch or less, and the relatively large diameter hole cutters have diameters of about 1 1/2 inch or greater. In some such embodiments, the axially-elongated aperture(s) is (are) oriented substantially parallel to the axis of the hole cutter for hole cutters having diameters of about 1 7/16 inch or less, and the axially-elongated apertures are oriented at an acute angle relative to the axis of the hole cutter for hole cutters having diameters of about 1 1/2 inch or greater.

In some embodiments of the present invention, the first fulcrum is located at approximately one end of the axially-elongated aperture, and the second fulcrum is located at approximately an opposite end of the aperture relative to the first fulcrum. In some embodiments, a third fulcrum is located approximately midway between the first and second fulcrums.

In some embodiments of the present invention, the second fulcrum is angularly and axially spaced relative to the first fulcrum, and in some embodiments, a third fulcrum is angularly and axially spaced between the first and second fulcrums. The hole cutter defines a direction of rotation that is the cutting direction of the cutting edge. In some such embodiments, the axially-elongated aperture defines a first end axially spaced adjacent to the cutting edge, and a second end axially spaced further away from the cutting edge than the first end and angularly spaced relative to the first end in a direction opposite to the cutting direction. In some such embodiments, the axially-elongated aperture defines an axially-elongated slot oriented at an acute angle relative to the axis of the blade body. The acute angle is at least about 30 degrees, and preferably is within the range of about 35 degrees, to about 60 degrees.

In some such embodiments, the first fulcrum is axially spaced from the cutting edge a first distance within the range of about 1/2 inch to about 1 inch, the second fulcrum is angularly spaced relative to the first fulcrum and is axially spaced from the cutting edge a second distance within the range of about 1 1/2 to about 2 inches, and the third fulcrum is angularly and axially spaced between the first and second fulcrums and is axially spaced from the cutting edge a third distance within the range of about 1 inch to about 1 1/2 inches. In some embodiments of the present invention, the first distance of the first fulcrum is configured for levering slugs having thicknesses of about 1/2 inch or less, the third distance of the third fulcrum is configured for levering slugs having thicknesses of about 1 inch or less, and the second distance of the second fulcrum is configured for levering slugs having thicknesses of about 1 1/2 inches or less.

In some embodiments of the present invention, the axially-elongated aperture defines a first end adjacent to the cutting edge, and the first end is axially spaced from the cutting edge a first distance within the range of about 15/100 inch to about 5/8 inch. In some such embodiments, the cutting edge is defined by a plurality of saw teeth including tips and gullets between the tips, and the first distance is measured from either (i) a deepest gullet of the cutting edge, or (ii) a plane extending between tips of unset teeth of the cutting edge.

In some embodiments of the present invention, each fulcrum is defined by a fulcrum surface oriented substantially parallel to the cutting edge. In some such embodiments, the fulcrum surface is rectilinear, curvilinear or both. In some such embodiments, the hole cutter includes a non-working end on the opposite end of the blade body relative to the cutting edge, and each fulcrum is formed on the edge of the respective aperture adjacent to, or on the side of, the non-working end of the hole cutter. In some such embodiments, each of a plurality of fulcrums defines a recess in said edge of the respective aperture adjacent to, or on the side of, the non-working end of the hole cutter.

In accordance with another aspect, the present invention is directed to a hole cutter comprising a substantially cylindrical blade body defining a cutting edge and at least one axially-elongated aperture formed through the blade body. The axially-elongated aperture is configured to receive therethrough a lever for removing work piece slugs from the interior of the blade body. The blade body defines within the axially-elongated aperture first means axially spaced adjacent to the cutting edge for engaging the lever and levering slugs having thicknesses within a first range of thicknesses out of the blade body and second means axially spaced further away from the cutting edge than the first means for engaging the lever and levering slugs out of the blade body having thicknesses within a second range of thicknesses greater than the first range of thicknesses. Some embodiments of the present invention further include third means axially spaced between the first and second means for engaging the lever and levering slugs out of the blade body having thicknesses within a range of thickness between the first and second range of thicknesses.

In some embodiments of the present invention, each of the first, second and third means is a respective fulcrum. In some embodiments of the present invention, the second means is angularly spaced relative to the first means, and the third means is angularly spaced between the first and second means. In some such embodiments, the third means is axially and angularly spaced approximately midway between the first and second means. In some embodiments, the at least one axially-elongated aperture defines an axially-elongated slot.

In some such embodiments, the hole cutter defines a direction of rotation that is the cutting direction of the cutting edge, and the axially-elongated aperture defines a first end axially spaced adjacent to the cutting edge, and a second end axially spaced further away from the cutting edge than the first end and angularly spaced relative to the first end in a direction opposite the cutting direction. In some such embodiments, the first means is axially spaced from the cutting edge a first distance within the range of about 1/2 inch to about 1 inch, the second means is angularly spaced relative to the first means and is axially spaced from the cutting edge a second distance within the range of about 1 1/2 to about 2 inches, and the third means is angularly and axially spaced between the first and second means and is axially spaced from the cutting edge a third distance within the range of about 1 inch to about 1 1/2 inches. In some embodiments, the first means is for levering slugs having thicknesses of less than about 1/2 inch, the third means is for levering slugs having thicknesses of less than about 1 inch, and the second means is for levering slugs having thicknesses of less than about 2 inches. Preferably, at least a portion of each of the first, second and third means is substantially parallel to the cutting edge.

One advantage of the hole cutters of the present invention is that they can provide a relatively quick, easy, and effective means to extract slugs from inside the hole cutters. Another advantage of the hole cutters of the present invention is that they provide multiple fulcrums at different axial locations, and in some embodiments, angular locations, to facilitate aligning the fulcrums with a variety of work piece slugs of different thicknesses. Yet another advantage of the hole cutters of the present invention is that they provide multiple fulcrums within the same axially-elongated aperture and thereby allow a user to work a slug out of the cutter by using multiple fulcrums without removing the lever, such as a screwdriver, from the aperture.

These and other advantages of the present invention, and/or of the currently preferred embodiments thereof, will become more readily apparent in view of the following detailed description of currently preferred embodiments and the accompanying drawings.

DETAILED DESCRIPTION

Figure 1:
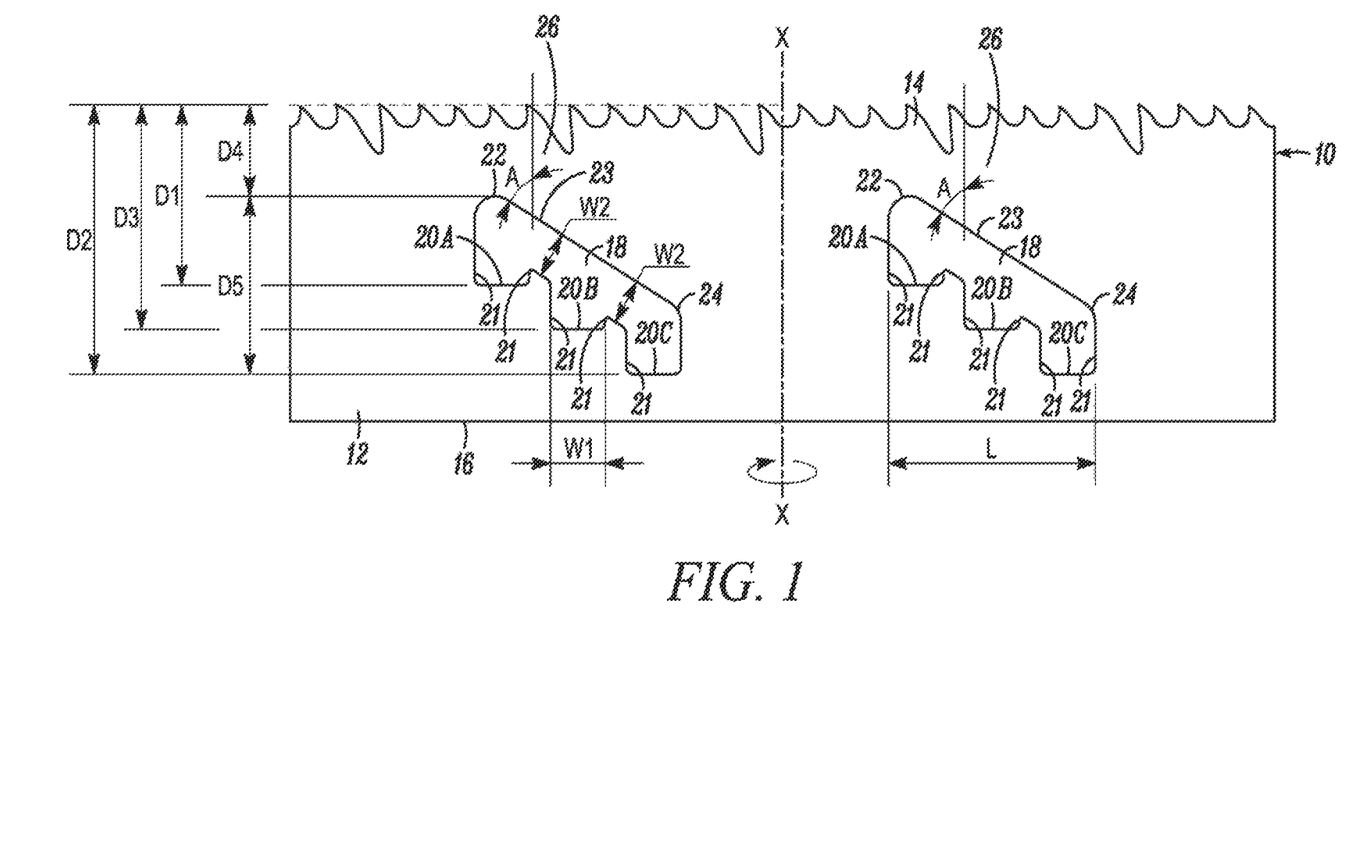
FIG. 1 is a side elevational view of a hole cutter blade of the present invention prior to being formed into a cylindrical blade body shape.

In FIG. 1, a blade body of a hole cutter embodying the present invention is indicated generally by the reference numeral 10. The term "hole cutter" is used here to mean a tool that cuts holes in work pieces, such as wood or metal work pieces, and includes without limitation hole saws. The blade body 10 is shown in FIG. 1 in its flattened state; however, as will be recognized by those of ordinary skill in the pertinent art based on the teachings herein, the blade body 10 is rolled or otherwise formed into a substantially cylindrical shape to form the hole cutter. The blade body 10 comprises a side wall 12 that extends around an axis of rotation "X" of the hole cutter to define a substantially cylindrical blade body. One end of the blade body is provided with a cutting edge 14 oriented substantially perpendicular to the axis of rotation X, and the opposing end of the blade body defines a rim 16. A cap (not shown) is fixedly secured to the rim 16 to enclose the respective end of the hole cutter. The end of the hole cutter opposite the cutting edge 14 and including the rim 16 and a cap (not shown) attached thereto is referred to herein as the "non-working" end of the hole cutter. As recognized by those of ordinary skill in the pertinent art, the cap (not shown) may include a threaded hub and pin apertures so that the hole cutter can be coupled to, and driven by, an arbor drivingly connected to a power tool, such as an electric drill. As shown in FIG. 1, the cutting edge 14 is defined by a plurality of teeth with gullets extending between the teeth. However, as may be recognized by those of ordinary skill in the pertinent art based on the teachings herein, the cutting edge may be defined by any of numerous different tooth forms or other cutting edge forms that are currently known or that later become known. Similarly, although the blade body 10 is formed from sheet metal that is rolled or otherwise formed into the cylindrical blade body 10 of the hole cutter and is, in turn, welded or otherwise attached to a cap, the hole cutter may be formed in any of numerous other ways that are currently known, or that later become known. For example, the end cap and side wall 12 may be spun, drawn, molded or otherwise formed in one part.

As shown in FIG. 1, the blade body 10 defines two axially-elongated apertures or slots 18 formed through the side wall 12 thereof. As can be seen, the two slots 18 are angularly spaced relative to each other on the cylindrical blade body 10. In the illustrated embodiment, the two slots 18 are approximately equally spaced relative to each other, i.e., the two slots are spaced about 180.degrees, relative to each other. In various embodiments of the invention, each slot 18 has an axial depth D5 (D4-D2) ranging from about 1⅛ inches to about 1⅝ inches. In the illustrated embodiment, each slot 18 has an axial depth D5 of about 1⅓ inches. In certain embodiments, each slot 18 has a circumferential length L ranging from about an inch to about 1⅝ inches. In the illustrated embodiment, each slot 18 has a circumferential length L of about 1⅕ inches. As described in further detail below, each axially-elongated aperture or slot 18 is configured to receive therethrough a lever, such as a screw driver, for removal of a work piece slug located within the interior of the blade body 10.

The number of axially-elongated apertures or slots 18 formed through the side wall 12 of the hole cutter depends on the size of the hole cutter. As a general rule, the larger the diameter of the hole cutter, the greater is the number of axially-elongated apertures or slots 18 that can be formed through the cylindrical blade body 10. In the currently preferred embodiments of the present invention, relatively small diameter hole cutters (e.g., about 9/16 inch diameter to about 1 3/16 inch diameter) have one slot 18 oriented substantially parallel to the axis X of the hole cutter, larger diameter hole cutters have two slots 18 (e.g., about N inch diameter to about 1 7/16 inches diameter) oriented substantially parallel to the axis X of the hole cutter, still larger diameter hole cutters (e.g., about 1½ inches diameter to about 3⅜ inches diameter) have two larger area slots 18 that are oriented at acute angles relative to the axis X of the hole cutter, and still larger diameter hole cutters (e.g., about 3½ inches diameter to about 6 inches diameter) have four larger area slots 18 oriented at acute angles relative to the axis X of the hole cutter. In the currently preferred embodiments of the hole cutters having multiple axially-extending slots 18, the axially-extending slots 18 are approximately equally spaced relative to each other about the axis X of the hole cutter, i.e., if there are two axially-extending slots 18 they are angularly spaced about 180.degrees, relative to each other, if there are three axially-extending slots 18 they are angularly spaced about 120.degrees, relative to each other, if there are four axially-extending slots 18 they are angularly spaced about 90.degrees, relative to each other, etc. However, as may be recognized by those of ordinary skill in the pertinent art based on the teachings herein, the axially-extending apertures or slots 18 need not be equally spaced relative to each other, nor do all axially-elongated apertures or slots 18 on the same hole cutter need to define the same aperture area or slot configuration.

In the illustrated embodiment, as shown in FIG. 1, each axially-elongated aperture or slot 18 includes three fulcrums 20A, 20B and 20C axially and angularly spaced relative to each other. However, as may be recognized by those of ordinary skill in the pertinent art based on the teachings herein, the slot 18 may include fewer than three fulcrums, or more than three fulcrums. The fulcrums 20A, 20B and 20C are recessed edge surfaces of the side wall 12 of the blade body 10 that are formed on the edge of a respective axially-extending aperture or slot 18 that is adjacent to, or on the side of, the non-working end of the hole cutter. In the embodiment of FIG. 1, the fulcrums 20A, 20B and 20C extend linearly in a direction substantially perpendicular to the axis of rotation X of the hole cutter or substantially parallel to the cutting edge 14. Accordingly, a common tool, such as a screw driver, can be inserted into the axially-extending aperture or slot 18, slipped into engagement with a respective fulcrum 20A, 20B or 20C, and manipulated as a lever against the respective fulcrum 20A, 20B or 20C to pry or push a slug out of the interior of the blade body 10. Each fulcrum 20A, 20B and 20C defines a width W1 that is sufficient to support a common tool or implement, such as the elongate shaft of an ordinary screw driver, e.g., a number 2 screw driver. Preferably, the recess of each fulcrum 20A, 20B and 20C defines a width W1 that is least about ¼ inch to allow insertion therein of a number 2 screw driver (which requires a width or clearance of about 0.27 inch), and preferably is within the range of about ¼ inch to about ⅓ inch. As can be seen, the recessed surface of each fulcrum 20A, 20B, and 20C is oriented substantially parallel to the cutting edge 14, and is located on the side of the axially-extending aperture or slot 18 opposite the cutting edge 14. In addition, each fulcrum 20A, 20B and 20C is recessed within the respective side edge of the axially-extending aperture or slot 18 so that a side edge or lip 21 is formed at either end of the fulcrum 20A, 20B and 20C to facilitate retaining a tool within the fulcrum 20A, 20B and 20C when levered against it. In the illustrated embodiment, each lip or fulcrum side edge 21 is oriented substantially normal to the cutting edge 14 or substantially parallel to the axis of rotation X of the hole cutter. The illustrated configuration, orientation and location of each fulcrum 20A, 20B and 20C facilitates engagement of the fulcrum 20A, 20B and 20C by a tool and levering of the tool against the fulcrum 20A, 20B and 20C to pry or otherwise move a work piece slug out of the interior of the blade body 10. Forming at least a portion of the fulcrum surface 20A, 20B and 20C substantially parallel to the cutting edge 14, and on the side of the axially-extending aperture or slot 18 opposite the cutting edge 14, facilitates in levering the tool against the side of the slug opposite the cutting edge 14 to force the slug out of the interior of the blade body 10.

As shown in FIG. 1, each slot 18 further defines a side edge 23 that is spaced opposite the fulcrums 20A, 20B and 20C by a minimum width W2 of the respective axially-extending slot 18 that is sufficient to allow a common tool, such as a number 2 screwdriver, to slide axially through the axially-extending slot 18 from one fulcrum 20A, 20B or 20C to another. The minimum width W2 is preferably at least about ¼ inch, is more preferably within the range of about ¼ inch to about ⅓ inch, and in the illustrated embodiment, is about 0.27 inch. Also in the illustrated embodiment, the side edge 23 of each axially-extending slot 18 is substantially smooth and rectilinear to facilitate sliding movement of a tool into and through the axially-extending slot 18 (e.g., from one fulcrum 20A, 20B or 20C to another to progressively remove a slug) and to facilitate chip and/or dust egress through the axially-extending slot 18. As may be recognized by those of ordinary skill in the pertinent art based on the teachings herein, the illustrated configuration, orientation, location and dimensions of each fulcrum 20A, 20B and 20C and axially-elongated aperture or slot 18 are only exemplary, and any of numerous other configurations, orientations, locations and/or dimensions that are currently known, or that later become known, equally may be employed.

As shown in FIG. 1, the first fulcrum 20A is axially spaced adjacent to the cutting edge 14, the second fulcrum 20C is axially spaced further from the cutting edge 14 as compared to the first fulcrum 20A and adjacent to the rim 16 or non-working end of the hole cutter, and the third fulcrum 20B is axially spaced between the first and second fulcrums 20A and 20C. In the illustrated embodiment, the first fulcrum 20A is located at approximately one end of the axially-elongated aperture or slot 18, the second fulcrum 20C is located at approximately an opposite end of the aperture or slot 18 relative to the first fulcrum 20A, and the third fulcrum 20B is located approximately midway between the first fulcrum 20A and the second fulcrum 20C.

As shown in FIG. 1, the first fulcrum 20A is axially spaced from the cutting edge 14 a first distance D1 within the range of about ½ inch to about 1 inch, the second fulcrum 20C is angularly spaced relative to the first fulcrum 20A and is axially spaced from the cutting edge 14 a second distance D2 within the range of about 1½ inches to about 2 inches, and the third fulcrum 20B is angularly and axially spaced between the first and second fulcrums 20A and 20C and is axially spaced from the cutting edge 14 a third distance D3 within the range of about 1 inch to about 1½ inches. In the illustrated embodiment, the first distance D1 of the first fulcrum 20A is configured for levering slugs having thicknesses of about ½ inch or less, the third distance D3 of the third fulcrum 20B is configured for levering slugs having thicknesses of about 1 inch or less (e.g., a ¾ inch thick plywood slug), and the second distance D2 of the second fulcrum 20C is configured for levering slugs having thicknesses of about 1½ inches or less (e.g., a 2.times.4 slug). In the illustrated embodiment, the distances D1, D2 and D3 are measured from a plane defined by the cutting edge 14, such as a plane extending between the tips of unset teeth. However, as may be recognized by those of ordinary skill in the pertinent art based on the teachings herein, the distances between the fulcrums 20A, 20B and 20C and the cutting edge 14, or between other features of the hole cutter and the cutting edge 14, may be measured with respect to any of numerous other reference lines or features that are currently known or used, or that later become known or used, such as from the base of the deepest gullets of the cutting edge teeth.

In the operation of the hole cutter of FIG. 1, in order to remove, for example, a relatively thick slug (e.g., a 2.times.4 slug) or a slug that has traveled deep into the interior of the bade body 10, a user may insert a tool through one of the axially-extending slots 18, place the tip of the tool in contact with the side of the slug facing the cap (not shown) or the interior of the blade body 10, select the second fulcrum 20C located axially furthest from the cutting edge 14 by placing a distal part of the tool into contact with the fulcrum 20C, and apply a force to a proximate portion of the tool to use the tool and the fulcrum 20C to lever the slug towards the cutting edge 14 and out of the interior of the blade body 10. If the slug is not removed by levering the tool against the second fulcrum 20C, the user can reposition the tool against the third or middle fulcrum 20B that is located axially closer to the cutting edge 14 within the same axially-extending slot 18, and use that fulcrum to lever the slug further towards the cutting edge 14 and/or out of the interior of the hole cutter. Similarly, if the slug is still not removed from the interior of the blade body 10 by levering the tool against the third or middle fulcrum 20B, the user can again reposition the tool, without having to remove the tool from the respective axially-extending slot 18, against the first fulcrum 20A adjacent to the cutting edge 14, and use the first fulcrum 20A to lever the slug towards the cutting edge 14 and out of the interior of the blade body 10. As can be seen, each axially-extending slot 18 provides multiple fulcrums 20A, 20B and 20C that can be used to progressively lever or otherwise work a slug out of the interior of the blade body 10 without having to remove the tool from the respective axially-extending slot 18.

As shown in FIG. 1, the fulcrums 20A, 20B and 20C are both axially and angularly spaced relative to each other such that the fulcrum 20A adjacent to the cutting edge 14 is located at a first end 22 of the axially-extending slot 18 closest to the cutting edge 14, the second fulcrum 20C is located at an opposite or second end 24 of the axially-extending slot 18, and the third fulcrum 20C is located between the first and second fulcrums 20A, 20C. In the embodiment of FIG. 1, the diameter of the hole cutter is sufficient to include two axially-extending slots 18 oriented at acute angles relative to the axis X of the hole cutter. Accordingly, each axially-extending slot 18 of FIG. 1 is oriented at an acute angle "A" with respect to the axis X of the hole cutter. In the currently preferred embodiments, the angle A is at least about 30.degrees, and is preferably within the range of about 35.degrees, to about 60.degrees. In the illustrated embodiment, the acute angle A is about 60.degrees. As can be seen, each axially-extending slot 18 slopes away from the cutting edge 14 in a direction opposite the cutting direction of the hole cutter. In the currently preferred embodiments of the hole cutters, the first end 22 of each axially-extending slot 18 is axially spaced from the cutting edge 14 a distance D4 within the range of about $15/100$ inch to about % inch. One advantage of this configuration is that the first or inlet end 22 of each axially-extending slot 18 is spaced closely adjacent to the cutting edge 14 to receive therefrom the chips or dust generated at the cutting edge 14 and, in turn, allow such chips or dust to egress through the axially-extending slot 18 and away from the interior of the blade body 10. Yet another advantage of this configuration is that the angular orientation of the axially-extending slots 18 facilitates in allowing the chips to flow up through the axially-extending slots 18 and away from the cutting edge 14 and interior of the blade body 10 as the hole cutter is rotated during a cutting operation. A further advantage of the illustrated blade body 10 is that the first or inlet end 22 of each axially-extending slot 18 is axially spaced adjacent to the cutting edge 14 such that a solid or substantially solid annular portion 26 of the blade body 10 extends between the first or inlet end 22 of each axially-extending slot 18 and the cutting edge 14. This annular portion 26 of the blade body 10 advantageously provides the blade body 10 with sufficient strength to withstand the heat applied to the blade body 10 during the manufacturing of the hole cutter without distorting the blade body, and provides sufficient strength to the hole cutter to withstand the forces encountered during cutting operations. However, the annular portion 26 of the blade body 10 is sufficiently thin (as indicated above, D4 is within the range of about $15/100$ inch to about % inch) to allow the chips and dust generated at the cutting edge 14 to flow into the axially-extending slots 18 and away from the interior of the blade body 10.

Figure 2:
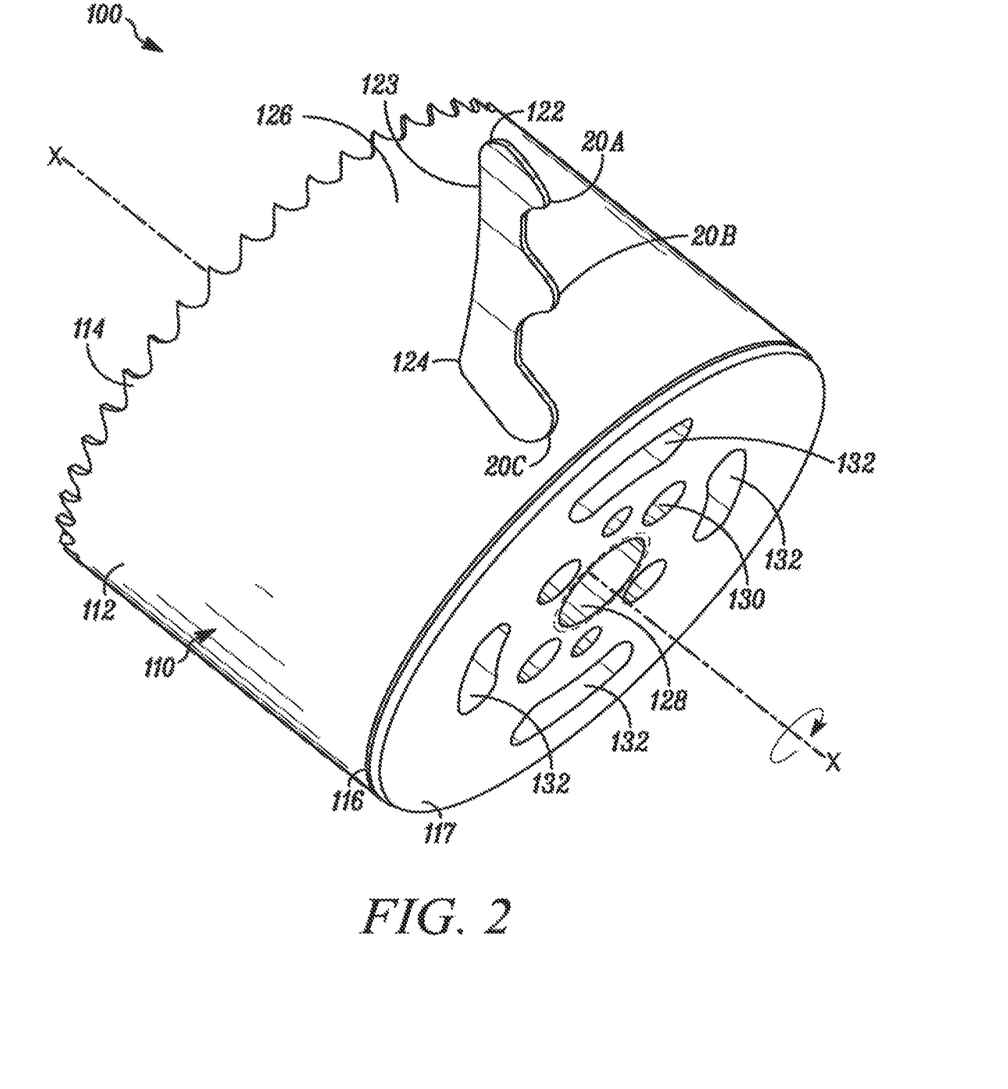
FIG. 2 is a perspective view of another embodiment of a hole cutter embodying the present invention.
Figure 3:
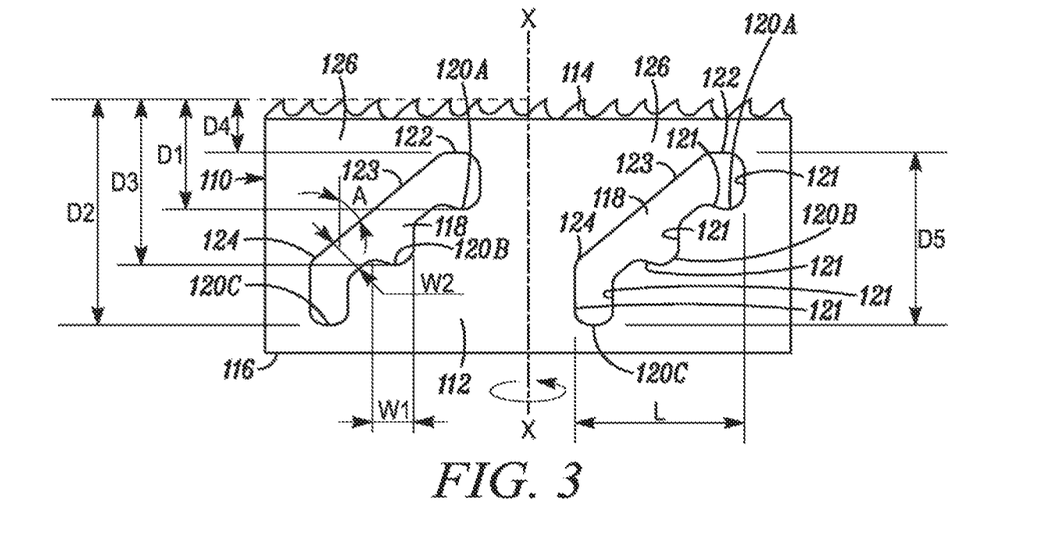
FIG. 3 is a side elevational view of the blade of the hole cutter of FIG. 2 prior to being formed into a cylindrical blade body shape.

In FIGS. 2 and 3, another embodiment of a hole cutter of the present invention is indicated generally by the reference numeral 100. The hole cutter 100 includes a substantially cylindrical blade body 110 that is substantially the same as the blade body 10 described above in connection with FIG. 1, and therefore like reference numerals preceded by the numeral "1" are used to indicate like elements. The primary difference between the blade body 110 of FIGS. 2 and 3 and the blade body 10 describe above is in the shape of the fulcrums 120A, 120B and 120C. As can be seen, the fulcrums 120A, 120B and 120C are defined by recessed curvilinear or radiused edges or surfaces of the axially-extending slots or apertures 118 that extend angularly in a direction substantially parallel to the cutting edge 114, as opposed to recessed linear edges or surfaces. As shown best in FIG. 3, the radiused fulcrums 120A, 120B and 120C generally extend angularly in a direction substantially perpendicular to the axis of rotation X of the cutter 100, and are curved such that each fulcrum surface 120A, 120B and 120C initially extends in a direction away from the cutting edge 114, reaches an apex, and then curves in a direction back towards the cutting edge 114. Thus, the radiused fulcrums 120A, 120B and 120C create gullet-like edges or surfaces wherein the deepest part of each gullet is closest to the rim 116 or non-working end of the hole cutter 100. In the same manner as described above in connection with the embodiment of FIG. 1, a tool, such as a standard Phillips number 2 screwdriver, can be placed into contact with the curvilinear fulcrums 120A, 120B and 120C, and pivoted about a respective fulcrum 120A, 120B or 120C to lever a slug out of the interior of the blade body 110. Therefore, the fulcrums 120A, 120B and 120C preferably define a radius and/or width W1 sufficient to receive therein a common tool or implement, such as the elongate shaft of a screw driver. The width W1 is preferably within the range of about ¼ inch to about ⅓ inch. The radiused nature of the fulcrums 120A, 120B and 120C is advantageous because the fulcrums 120A, 120B and 120C mimic the shape of common tools, such as the shaft of a screwdriver. In addition, the curvilinear shape of each fulcrum 120A, 120B and 120C laterally supports a tool received within the 120A, 120B or 120C fulcrum to thereby prevent the tool from slipping, sliding or otherwise becoming disengaged from the fulcrum 120A, 120B or 120C when levering a work piece slug. As may be recognized by those of ordinary skill in the pertinent art based on the teachings herein, the above-described fulcrum shapes and dimensions are only exemplary, and any of numerous other shapes and/or dimensions that are currently known, or that later become known, equally may be employed.

Another difference between the blade body 110 of FIGS. 2 and 3 and the blade body 110 describe above is the angled orientation of the axially-extending slots or apertures 118. As shown in FIGS. 2 and 3, the axially-extending slots or apertures 118 of the blade 110 are set at a smaller acute angle with respect to the axis X of the blade body 110 as compared to the axially-extending slots or apertures 18 of the blade 10 shown in FIG. 1. In the illustrated embodiment shown in FIGS. 2 and 3, the acute angle A is about 47.degrees.

As shown in FIG. 2, the hole cutter 100 includes cap 117 welded to the rim 116 of the blade body 110 and forming a part of the non-working end of the hole cutter. The cap 117 includes a central hub 128 defining a threaded aperture for threadedly engaging an arbor, a plurality of drive pin apertures 130 substantially equally spaced relative to each other about the central hub 128 for engaging the drive pins of the arbor, and a pair of angularly-extending apertures 132 spaced about 180.degrees, apart on opposite sides of the hub 128 relative to each other. The angularly-extending apertures 132 are dimensioned and positioned to allow insertion therein of a tool, such as a screw driver, to further facilitate in work piece slug removal.

Figure 4:
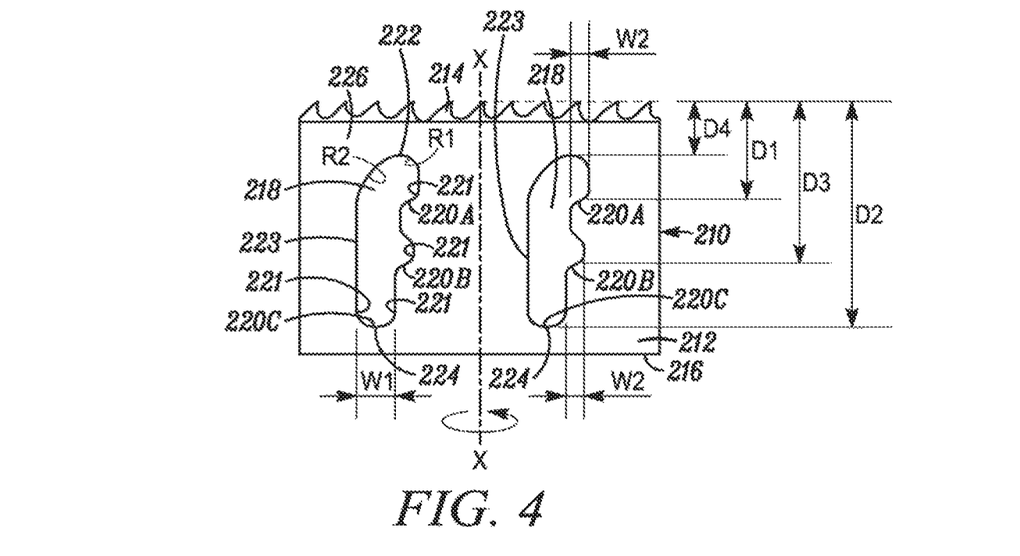
FIG. 4 is a side elevational view of another embodiment of a hole cutter blade of the present invention used for smaller diameter hole cutters and prior to being formed into a cylindrical blade body shape.

In FIG. 4, another embodiment of a hole cutter of the present invention is indicated generally by the reference numeral 200. The hole cutter 200 includes a substantially cylindrical blade body 210 that is substantially the same as the blade bodies 10 and 110 described above in connection with FIGS. 1 through 3, and therefore like reference numerals preceded by the numeral "2", or preceded by the numeral "2" instead of the numeral "1", are used to indicate like elements. The primary difference of the blade body 210 in comparison to the blade bodies described above is that the axially-extending slots or apertures 218 are oriented substantially parallel to the axis of rotation X of the hole cutter 200. The blade body 210 forms a relatively small diameter hole cutter 200, and therefore the axially-extending slots 218 cannot define as large a slot area as the larger diameter hole cutters described above, and/or cannot be oriented at acute angles relative to the axis of rotation X of the hole cutter 200. In the illustrated embodiment, the blade body 210 is used to form hole cutters defining blade body diameters within the range of about N inch to about 1⁷⁄₁₆ inches. The currently preferred embodiments of smaller diameter hole cutters (e.g., about 1³⁄₁₆ inches diameter or less) define the same slot configuration as illustrated in FIG. 3, but include only one such slot.

Another difference of the blade body 210 is in the shapes of the fulcrums 220A, 220B and 220C. As can be seen, the first fulcrum 220A is defined by a curvilinear surface extending laterally from the axially-extending slot 218 substantially parallel to the cutting edge 214, but sloping slightly away from the cutting edge 214 in a direction opposite to the cutting direction of the blade 210. The first fulcrum 220A includes only one side edge 221 that is oriented substantially parallel to the axis of rotation X of the hole cutter. The third or middle fulcrum 220B is similarly defined by a curvilinear surface extending laterally from the axially-extending slot 218 substantially parallel to the cutting edge 214, but sloping slightly away from the cutting edge 214 in a direction opposite to the cutting direction of the blade 210. Like the first fulcrum 220A, the third or middle fulcrum 220B includes only one side edge 221 that is oriented substantially parallel to the axis of rotation X of the hole cutter 200, but is curvilinear rather than rectilinear. The second fulcrum 220C is defined by the second end 224 of the axially-extending slot 218, and as can be seen, is defined by a curvilinear surface extending substantially parallel to the cutting direction of the blade 210, and two side surfaces 221 extending substantially parallel to the axis of rotation X of the blade 210 and formed by the respective side edges of the second end 224 of the axially-extending slot 218. In the illustrated embodiment, the width W2 of each of the first fulcrums 220A and the third or middle fulcrums 220B is preferably within the range of about ²⁄₁₀ to about ½ inch, and more preferable within the range of about ¼ to about ⅜ inch. The first fulcrums 220A and the third or middle fulcrums 220B need not be as wide as the diameter of a number 2 screwdriver, for example, because part of the screwdriver shaft can be received in the fulcrum 220A, 220B while another portion of the screwdriver shaft can extend into the adjacent portion of the axially-extending slot 218. The width W1 of the third fulcrum 220C, on the other hand, is preferably at least about 0.27 inches to allow insertion therein of a number 2 screwdriver.

Another difference of the hole cutter 200 in comparison to the hole cutter 100 described above is the configuration of the first or inlet end 222 of each axially-extending slot 218. As can be seen, the side edge 221 of the first fulcrum 220A extends linearly and substantially parallel to the axis of rotation X. The first or inlet end 222 of each axially-extending slot 218 is defined by two curvilinear regions. A first curvilinear region is contiguous to the first fulcrum side edge 221 and defined by one or more relatively small radii R1, and a second curvilinear region is contiguous to the side edge 223, is defined by one or more larger radii R2 and is located on an opposite side of the axially-extending slot 218 relative to the first fulcrum side edge 221. As can be seen, the larger radius R2 imparts a shape to the respective edge of the axially-extending slot 218 that slopes away from the cutting edge 214 in a direction opposite the cutting direction of the blade 210. In addition, the location of the first fulcrum 220A and the orientation of the respective side edge 221 oriented substantially parallel to the axis of rotation X imparts a relatively wide first end or entrance region 222 to the axially-extending slot 218 to facilitate the flow of chips or dust from the cutting edge 214 into the axially-extending slot 218. In the illustrated embodiment, the width at the inlet end 222 of the axially-extending slot 218 is within the range of about 1¼ to about 1½ times the minimum width W1 or width at the outlet end 224 of the axially-extending slot 218, and preferably is at least about 1⅓ times the width W1.

Figure 5:
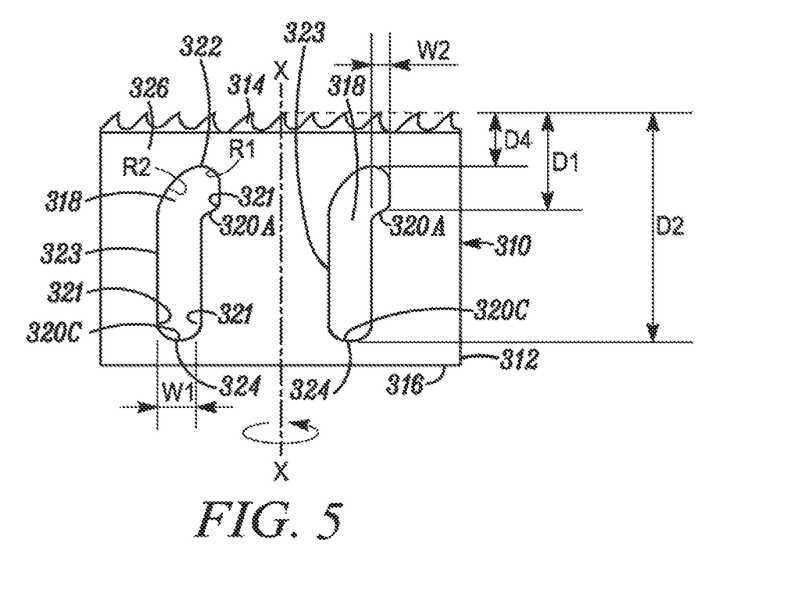
FIG. 5 is a side elevational view of another embodiment of a hole cutter blade of the present invention used for smaller diameter hole cutters and prior to being formed into a cylindrical blade body shape.

In FIG. 5, another embodiment of a hole cutter of the present invention is indicated generally by the reference numeral 300. The hole cutter 300 includes a substantially cylindrical blade body 310 that is substantially the same as the blade body 210 described above in connection with FIG. 4, and therefore like reference numerals preceded by the numeral "3" instead of the numeral "2", are used to indicate like elements. The primary difference of the blade body 310 in comparison to the blade bodies described in connection with FIG. 4 is that the axially-extending slots or apertures 318 define two fulcrums 320A, 320C instead of three fulcrums. In the illustrated embodiment, the blade body 310 is used to form hole cutters defining blade body diameters within the range of about N inch to about 1⁷⁄₁₆ inches. The currently preferred embodiments of smaller diameter hole cutters (e.g., about 1³⁄₁₆ inches diameter or less) define the same slot configuration as illustrated in FIG. 5, but include only one such slot. The second fulcrum 320C is axially spaced from the cutting edge 314 a distance D2 within the range of about 1½ inches to about 2 inches. As noted above, the second fulcrum 320C being located in this range is advantageously configured for levering slugs from 2-by wood (e.g., 2×4, 2×6, 2×8, etc.), such as slugs of about 1⅝ inches or less.

The hole cutters of the present invention may include one or more features of the hole cutters disclosed and/or claimed in any of the following co-pending patent applications that are assigned to the assignee of the present invention and are hereby expressly incorporated by reference in their entireties as part of the present disclosure: the U.S. patent application filed on even date herewith, U.S. patent application Ser. No. 12/687,052, and entitled "Coated Hole Cutter"; the U.S. patent application filed on Jan. 13, 2010, U.S. patent application Ser. No. 12/687,073, and entitled "Hole Cutter With Minimum Tooth Pitch to Blade Body Thickness Ratio"; the U.S. patent application filed on Jan. 13, 2010, U.S. patent application Ser. No. 12/687,102, and entitled "Hole Cutter With Extruded Cap"; the U.S. patent application filed on Jan. 13, 2010, U.S. patent application Ser. No. 12/687,078, and entitled "Hole Cutter With Chip Egress Aperture"; the U.S. Design patent application filed on Jan. 13, 2010, U.S. patent application Ser. No. 29/353,762, and entitled "Hole Saw"; and the U.S. Design patent application filed on Jan. 13, 2010, U.S. patent application Ser. No. 29/353,759, and entitled "Hole Saw".

It may be readily understood by those having skill in the pertinent art from the present disclosure that any of numerous changes and modifications may be made to the above-described and other embodiments of the present invention without departing from the scope of the invention as defined in the appended claims. For example, the hole cutters may be made from any of numerous different materials, in any of numerous shapes, taking any of numerous different dimensions. For example the cutting edge may be made from any of numerous different materials or combinations of materials that are currently known or that later become known. As an example, the cutting edge may take any form, pattern, arrangement or configuration that is currently known or that later becomes known, including without limitation, tooth patterns that tend to function well in specific applications, hybrid applications or general applications. For example, the cutting teeth may define any of numerous different tooth forms, pitch patterns and/or set patterns. As another example, a single aperture may be provided in the body of the cutter, two or more apertures may be angularly and/or axially aligned with one another, or two or more apertures may be variably angularly and/or axially spaced relative to one another. Also, the hole cutters may be used in any of numerous different cutting applications, on any of numerous different work piece materials, such as woods, metals, plastics, composites, resins, stones, fabrics, foams, etc. Further, one or more apertures may extend to the cutting edge, to the rim of the side wall or cap, or even extend to both the cutting edge and to the rim of the side wall or cap. As another example, the length or width of each fulcrum may not be the same from fulcrum to fulcrum or aperture to aperture. As yet another example, the fulcrum surfaces may not extend linearly in a direction perpendicular to the axis of rotation of the cutter about the circumference of the cutter. Instead, the fulcrum surfaces may define curved, curvilinear, rectilinear, angled surfaces and/or combinations of the foregoing. Still further, the aperture side edges may not extend linearly and axially to define the angular width of the angled slots or apertures and connect the outer-lying fulcrums to the bottom edge surface of the apertures by radiused corners. Instead, for example, the aperture side edges may be curved, curvilinear, rectilinear, angled and/or any combination of the foregoing, and the intersections of the aperture side edges and the end surfaces of the apertures and the outer-lying fulcrums may be right, obtuse and/or acute intersections, or may define rectilinear and/or curvilinear corners. Similarly, the surfaces that extend between the fulcrums may not be linear and the transitions between the surfaces may not be defined by radiuses. As an alternative, for example, these surfaces may be curved, curvilinear, rectilinear and/or alternatively angled, and the transitions between these surfaces may be right, obtuse and/or acute intersections or may define curvilinear and/or rectilinear corners. As another example, additional surfaces may be included, or surfaces may be removed, from the apertures, such as surfaces located adjacent to, or between, the fulcrums. In addition, the axially-elongated apertures or slots may define a different number of fulcrums or like surfaces than illustrated herein, or some axially-elongated apertures or slots may define a different number of type of fulcrums than other apertures or slots of the same hole cutter. Accordingly, this detailed description of the currently preferred embodiments of the present invention is to be taken in an illustrative, as opposed to a limiting sense.

What is claimed is:

1. A hole cutter comprising:
   a substantially cylindrical blade body having a smooth outer wall, a cutting edge at a top end of the blade body and a base portion at a bottom end of the blade body, the blade body defining a longitudinal axis extending from the bottom end to the top end;
   a first aperture portion formed through the blade body and spaced from the cutting edge such that a portion of the blade body is disposed between the cutting edge and the first aperture portion, the first aperture portion bounded at least partially by a first curvilinear surface that defines a first fulcrum and wherein the first aperture portion is configured to receive therethrough a lever with the lever engaging the first fulcrum to lever a slug toward the top of the blade body to facilitate removing the slug from the blade body;
   a second aperture portion formed through the blade body and spaced from the cutting edge such that a portion of the blade body is disposed between the cutting edge and the second aperture portion, the second aperture portion bounded at least partially by a second curvilinear surface that defines a second fulcrum and wherein the second aperture portion is configured to receive therethrough a lever with the lever engaging the second fulcrum to lever the slug toward the top of the blade body to facilitate removing the slug from the blade body; and
   a third aperture portion formed through the blade body and spaced from the cutting edge such that a portion of the blade body is disposed between the cutting edge and the third aperture portion, the third aperture portion bounded at least partially by a third curvilinear surface that defines a third fulcrum and wherein the third aperture portion is configured to receive therethrough a lever with the lever engaging the third fulcrum to lever the slug toward the top of the blade body to facilitate removing the slug from the blade body,
   wherein the first fulcrum is axially spaced from the cutting edge by a first distance, the second fulcrum is axially spaced from the cutting edge by a second distance that is greater than the first distance, and the third fulcrum is axially spaced from the cutting edge by a third distance that is greater than the second distance, and
   wherein the first fulcrum, the second fulcrum, and the third fulcrum are aligned along an aperture axis at an acute angle to the longitudinal axis.

2. The hole cutter of claim 1, wherein the first curvilinear surface at least partially bounds a bottom portion of the first aperture portion, the second curvilinear surface at least partially bounds a bottom portion of the second aperture portion, and the third curvilinear surface at least partially bounds a bottom portion of the third aperture portion.

3. The hole cutter of claim 2, wherein the first aperture portion is also at least partially bounded by a top surface that is generally straight and parallel to the cutting edge.

4. The hole cutter of claim 1, wherein each of the first curvilinear surface, the second curvilinear surface, and the third curvilinear surface are concave and face toward the top end of the blade body.

5. The hole cutter of claim 1, wherein the first aperture portion is in communication with the second aperture portion.

6. The hole cutter of claim 5, wherein the second aperture portion is in communication with the third aperture portion.

7. The hole cutter of claim 1, wherein the cutting edge defines a direction of rotation that is a cutting direction of the cutting edge.

8. The hole cutter of claim 7, wherein the first fulcrum is angularly spaced about the circumference of the blade body from the second fulcrum in the cutting direction.

9. The hole cutter of claim 8, wherein the second fulcrum is angularly spaced about the circumference of the blade body from the third fulcrum in the cutting direction.

10. The hole cutter of claim 1, wherein the blade body defines a first set that includes the first aperture portion, the second aperture portion, and the third aperture portion, and a second set that includes a fourth aperture portion, a fifth aperture portion, and a sixth aperture portion that are substantially the same as the first aperture portion, the second aperture portion, and the third aperture portion, respectively, the first set and the second set disposed on opposite sides of the blade body.

\* \* \* \* \*